W. F. HELLEN
EGG TONGS.
No. 66,492.
Patented July 9, 1867.
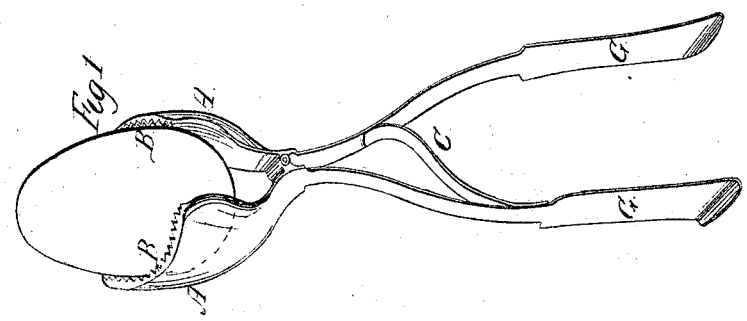
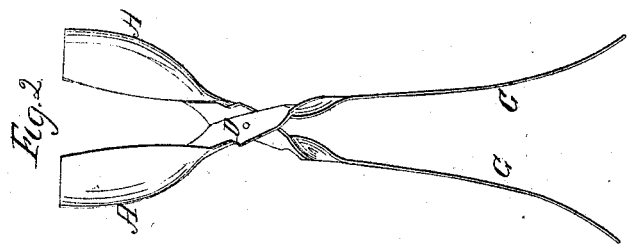
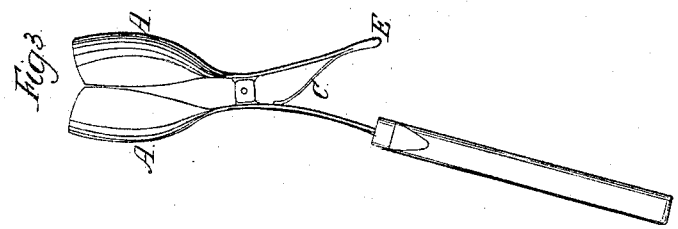

United States Patent Office.

W. F. HELLEN, OF WASHINGTON, DISTRICT OF COLUMBIA.

Letters Patent No. 66,492, dated July 9, 1867.

IMPROVED EGG-TONGS.

The Schedule referred to in these Letters Patent and making part of the same.

TO ALL WHOM IT MAY CONCERN:

Be it known that I, W. F. HELLEN, of the city of Washington, and District of Columbia, have invented a new and useful "Egg-Tongs;" and I do hereby declare that the following is an exact description thereof, reference being had to the accompanying drawings, and to the letters of reference marked thereon, making a part of this specification, in which—

Figure 1 represents a perspective view of the tongs holding an egg.

Figures 2 and 3 show the same tongs, but that they may be used with any style of handles.

The nature of my invention consists in the shape and construction of the tongs, made of any material, so as to conform with the shape of an egg.

A represents the tongs, that are curved to suit the shape of an egg, with teeth, B, on the inside around the top edge. The tongs clasp the egg and hold it, and, if necessary, the teeth B are pressed against the upper half of the egg to cut the shell, so that the top part of the egg may be easily opened to empty the egg on the breakfast plate, when the egg is too hot to handle. The egg can, by these tongs, be lifted out of the boiling water, opened, and used without using the fingers to do it. The tongs can also be used by confectioners to open and break the eggs with facility. They can be used with one or two handles, with a spring, C, or as shears operating on a pivot, D—for table use with short handles, as at E, and for confectioners' or bakers' use with long handles, as at G.

What I claim as my invention, and desire to secure by Letters Patent, is—

The construction and form of the tongs A, to correspond with the shape of an egg, when constructed of any material, with or without teeth B, and with any kind of a handle to operate them, as herein described and for the purposes set forth.

W. F. HELLEN.

Witnesses:
J. FRANKLIN REIGART,
JOHN S. HOLLINGSHEAD.